(12) United States Patent
Huang et al.

(10) Patent No.: US 8,810,225 B2
(45) Date of Patent: Aug. 19, 2014

(54) METHODOLOGY OF ON-CHIP SOFT-START CIRCUITS FOR SWITCHING MODE DC/DC CONVERTER

(75) Inventors: Chung-Kuang Huang, Zhubei (TW); Xiao-Ming Duan, Zhubei (TW); Ronald Chang, Zhubei (TW)

(73) Assignee: Hanergy Technologies, Inc., Zhubei (TW)

( * ) Notice: Subject to any disclaimer, the term of this patent is extended or adjusted under 35 U.S.C. 154(b) by 283 days.

(21) Appl. No.: 13/338,004

(22) Filed: Dec. 27, 2011

(65) Prior Publication Data

US 2012/0169302 A1 Jul. 5, 2012

(30) Foreign Application Priority Data

Dec. 31, 2010 (TW) ................................ 99147385 A

(51) Int. Cl.
*H02M 1/36* (2007.01)
*H02M 3/158* (2006.01)
*H02M 3/155* (2006.01)

(52) U.S. Cl.
CPC ................ *H02M 3/158* (2013.01); *H02M 1/36* (2013.01); *Y10S 323/901* (2013.01); *Y10S 323/908* (2013.01)
USPC ........................... 323/284; 323/901; 323/908

(58) Field of Classification Search
CPC ....... H02M 1/36; H02M 3/155; H02M 3/156; H02M 2001/0003; H02M 2003/155; H02M 2003/156
USPC ............. 323/282, 284, 351, 901, 908; 363/49
See application file for complete search history.

(56) References Cited

U.S. PATENT DOCUMENTS

2010/0219803 A1* 9/2010 Han et al. ...................... 323/284

* cited by examiner

*Primary Examiner* — Gary L Laxton
(74) *Attorney, Agent, or Firm* — Patent Law Group LLP; David C Hsia

(57) ABSTRACT

Methods of a switching mode DC/DC converter are provided in the present invention. The proposed method includes a step of causing a switching frequency of the converter to be operated at a rated value multiplied by a second predetermined value when an output voltage of the converter is not larger than a first predetermined value.

10 Claims, 4 Drawing Sheets

METHODOLOGY OF ON-CHIP SOFT-START CIRCUITS FOR SWITCHING MODE DC/DC CONVERTER

FIELD OF THE INVENTION

The application claims the benefit of Taiwan Patent Application No. 099147385 filed on Dec. 31, 2010, in the Taiwan Intellectual Property Office, the disclosures of which are incorporated herein in their entirety by reference.

The present invention relates to a method of soft-start circuits for a switching mode DC/DC converter. More particularly, it relates to a method of on-chip soft-start circuits for a switching mode DC/DC converter.

BACKGROUND OF THE INVENTION

Among different DC/DC converters, an inrush current and an overshoot voltage appear in the startup period, which may damage the whole system, decrease the power efficiency, and cause system errors. Therefore, the soft-start function is used to smoothly increase the output voltage and the inductor current to the target values. There are numerous different types of soft-start circuits which have been implemented. The conventional soft-start circuit is shown in FIG. 1. In FIG. 1, the DC/DC converter 1 (which is a switching mode DC/DC converter) includes a mode switch circuit, a soft-start circuit, an error amplifier, a first comparator, a second comparator, an oscillator OSC, a driver, a switch sw, a diode, an inductor with an inductor current iL, a capacitor, a first resistor, and a second resistor. The switch sw is coupled with the inductor and the diode at a node SW, the DC/DC converter receives an input voltage VIN and generates an output voltage VO across two output terminals 12 and 13, and a voltage divider 14 comprises the first resistor and the second resistor, and generates a detected voltage Vfb of the output voltage VO to for provide a feedback to an input terminal 11 (of the error amplifier) of the DC/DC converter.

However, when the duty ratio=VO/VIN is too low (e.g., less than 10%) and the switching frequency is also very slow (e.g. 50 KHz), the inrush current and the overshoot voltage will be much higher than the safe range which the system can stand. When the duty ratio is too low and the switching frequency is also very slow, the waveforms of the inductor current $i_L$, a detected value ($V_{fb}$) of the output voltage VO and an voltage $V_{SW}$ of a node SW of the DC/DC converter as shown in FIG. 1 are shown in FIG. 2. In the waveforms related to $V_{fb}$ of FIG. 2, a trapezoidal waveform shows a safe range that the DC/DC converter can bear, and the waveform of $V_{fb}$ exceeds the safe range at the moment of a little bit more than 500 μsec.

When the switching frequency is relatively fast (e.g. 1 MHz), the inrush current and the overshoot voltage still happen and are higher than the safe range that the DC/DC converter can bear. When the switching frequency is relatively fast, the waveforms of the inductor current $i_L$, a detected value ($V_{fb}$) of the output voltage VO and an voltage $V_{SW}$ of a node SW of the DC/DC converter of FIG. 1 are shown in FIG. 3. In the waveforms related to $V_{fb}$ of FIG. 3, a trapezoidal waveform shows a safe range that the DC/DC converter can bear, and the waveform of $V_{fb}$ always exceeds the safe range, and begins to exceed the safe range dramatically at the moment of about 100 μsec.

Keeping the drawbacks of the prior arts in mind, and employing experiments and research full-heartily and persistently, the applicant finally conceived a methodology of on-chip soft-start circuits for a switching mode DC/DC converter.

SUMMARY OF THE INVENTION

It is therefore an object of the present invention to provide a method of on-chip soft-start circuits for a switching mode DC/DC converter to curb an inrush current and an overshoot voltage generated by the converter during a soft-start thereof.

According to the first aspect of the present invention, a controlling method for a switching mode DC/DC converter comprises a step of, when a detected value of an output voltage of the converter is not larger than a first predetermined value, causing a switching frequency of the converter to be operated at a rated value multiplied by a second predetermined value to curb at least one of an inrush current and an overshoot voltage generated by the converter during a soft-start thereof.

According to the second aspect of the present invention, a controlling method for a DC/DC converter comprises steps of: causing a switching frequency of the converter to be operated at a rated value when a detected value of an output voltage of the converter is larger than a first predetermined value; and causing the switching frequency of the converter to be operated at the rated value multiplied by a second predetermined value when the detected value of the output voltage is not larger than the first predetermined value.

According to the third aspect of the present invention, a controlling method for a switching mode DC/DC converter comprises a step of, when an output voltage of the converter is not larger than a first predetermined value, causing an operating frequency of the converter to be operated at a rated value multiplied by a second predetermined value.

The present invention may best be understood through the following descriptions with reference to the accompanying drawings, in which:

DETAILED DESCRIPTION OF THE PREFERRED EMBODIMENT

The present invention provides a method of on-chip soft-start circuits for a switching mode DC/DC converter. In the present invention, the switching frequency is adaptively swapped during the soft-start period to solve the above-mentioned problems of the inrush current and the overshoot voltage generated by the converter during the soft-start thereof.

Figure 1:
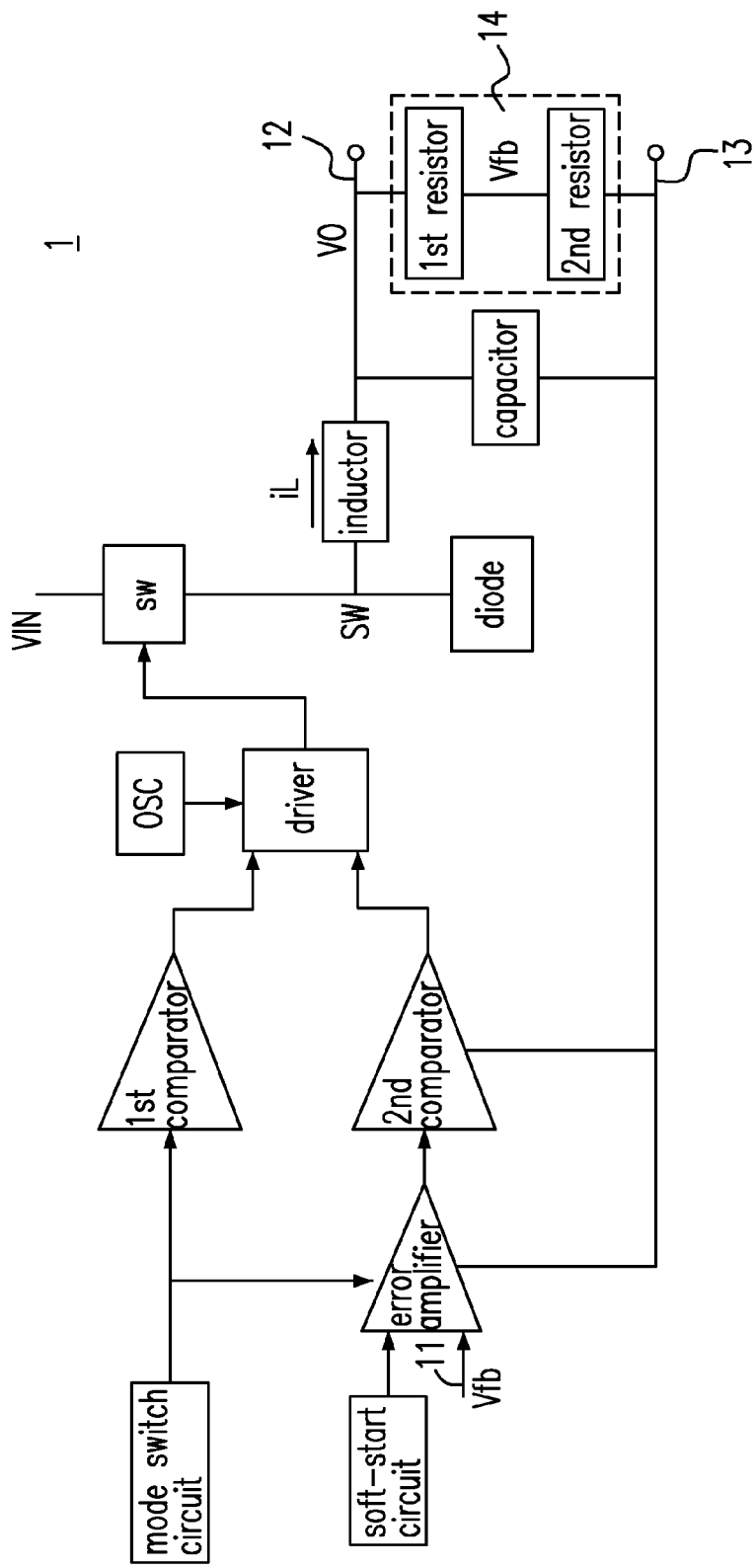
FIG. 1 is a circuit diagram of a buck type DC/DC converter having a soft-start circuit in the prior art.
Figure 2:
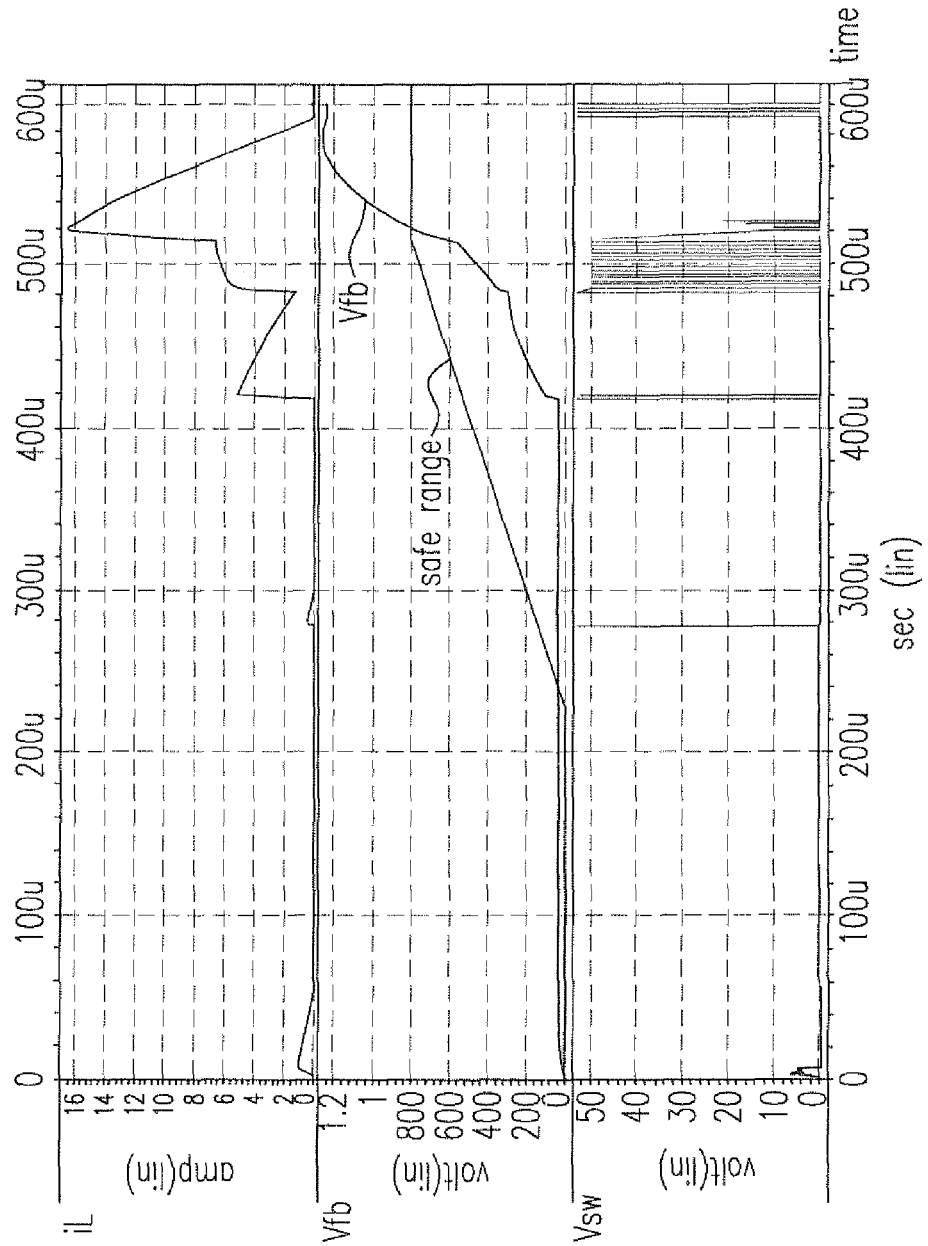
FIG. 2 is a waveform diagram showing the waveforms of the inductor current $i_L$, a detected value ($V_{fb}$) of the output voltage (VO) and an voltage ($V_{SW}$) of a node SW of the DC/DC converter of FIG. 1 when the duty ratio is lower and the switching frequency is also lower according to a controlling method of a DC/DC converter in the prior art.
Figure 3:
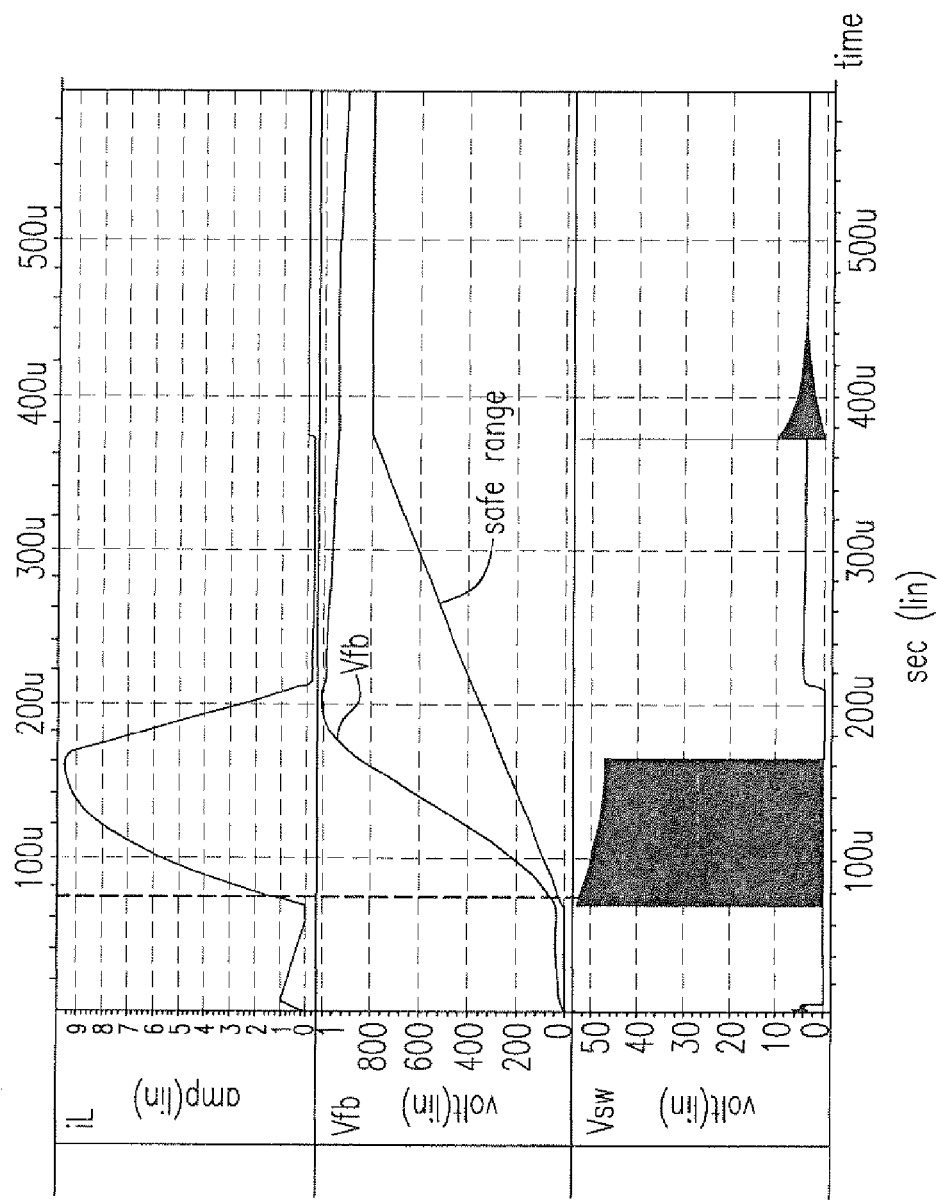
FIG. 3 is a waveform diagram showing the waveforms of the inductor current $i_L$, a detected value ($V_{fb}$) of the output voltage (VO) and an voltage ($V_{SW}$) of a node SW of the DC/DC converter of FIG. 1 when the switching frequency is higher according to a controlling method of a DC/DC converter in the prior art.

According to the first preferred embodiment of the present invention, a controlling method of a switching mode DC/DC converter (e.g., FIG. 1) includes a step of, when a detected value ($V_{fb}$) of an output voltage of the converter (VO) is not larger than a first predetermined value, causing a switching frequency of the converter to be operated at a rated value multiplied by a second predetermined value to curb at least one of an inrush current and an overshoot voltage generated by the converter during a soft-start thereof. The converter comprises an input terminal (e.g., an input terminal of the error amplifier), and the method further comprises steps of: sending a feedback of the detected value ($V_{fb}$) to the input terminal to adjust the output voltage (VO) accordingly and causing the switching frequency of the converter to be operated at the rated value when the detected value ($V_{fb}$) of the output voltage (VO) is larger than the first predetermined value. The converter comprises two output terminals and a voltage divider electrically connected to the two output terminals in parallel (e.g. the voltage divider comprising the first resistor and the second resistor as shown in FIG. 1), the voltage divider is used to detect the detected value ($V_{fb}$) of the output voltage (VO), the first predetermined value is a rated output value of the voltage divider (the rated value of $V_{fb}$) multiplied by a first rate, and the second predetermined value is a second rate. For example, the first rate is 0.75, the second rate is in a range of ¼ to ⅓, the voltage divider comprises a first and a second resistors electrically connected to each other in series, and the rated output value is a voltage drop of the second resistor.

When the sensed voltage $V_{fb}$ of the DC/DC converter as shown in FIG. 1 is less than 75% of $V_{fb}$'s rated value, the switching frequency is set at a lower frequency (e.g., the switching frequency fsw=fnor/n, n=3~4, wherein fsw is the current switching frequency, fnor is a rated value of the switching frequency). When a sensed value of the sensed voltage $V_{fb}$ is larger than 75% of $V_{fb}$'s rated value, the switching frequency of the DC/DC converter is set at the rated value of the switching frequency. In this way, both the inrush current and the overshoot voltage are improved dramatically. The converter will generate the inrush current and the overshoot voltage during the soft-start in one of two states that a duty ratio and the switching frequency are a first and a second relatively low values respectively, and that the switching frequency is a relatively high value.

As aforementioned, the converter will generate the inrush current and the overshoot voltage during the soft-start in one of two states that a duty ratio and the switching frequency are a first and a second relatively low values respectively, and that the switching frequency is a relatively high value. The converter receives an input voltage VIN and generates the output voltage VO, the duty ratio=VO/VIN, the first relatively low value is 0.1, the second relatively low value is 50 KHz, and the relatively high value is 1 MHz.

Figure 4:
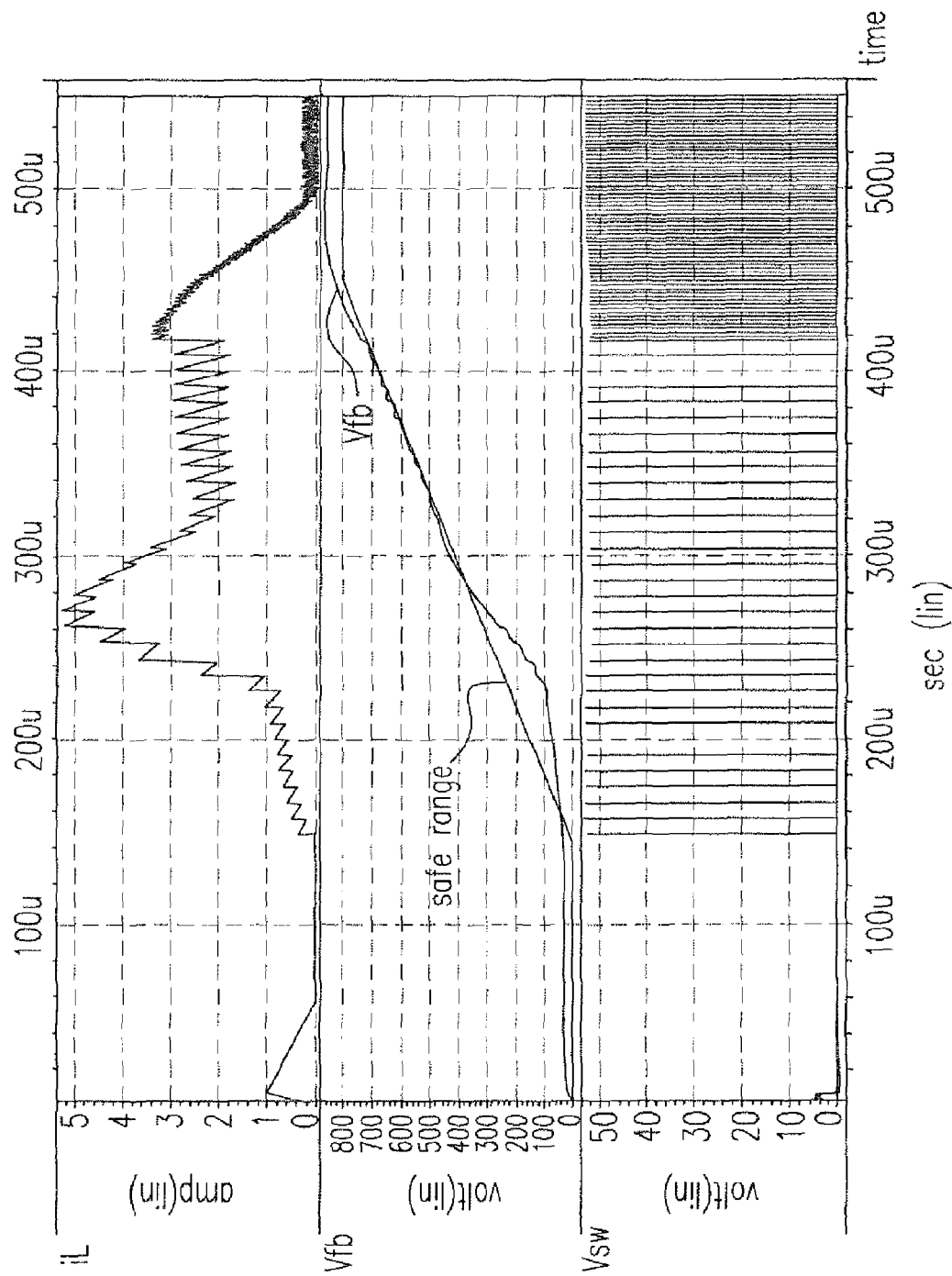
FIG. 4 is a waveform diagram showing the waveforms of the inductor current $i_L$, a detected value ($V_{fb}$) of the output voltage (VO) and an voltage ($V_{SW}$) of a node SW of the DC/DC converter of FIG. 1 according to a controlling method of a DC/DC converter of the first preferred embodiment of the present invention.

FIG. 4 shows the waveforms of the inductor current $i_L$, a detected value ($V_{fb}$) of the output voltage VO and an voltage $V_{SW}$ of a node SW of the DC/DC converter of FIG. 1 according to a controlling method of a DC/DC converter of the first preferred embodiment of the present invention. In the waveforms related to $V_{fb}$ of FIG. 4, a trapezoidal waveform also shows a safe range that the DC/DC converter can bear, and the waveform of $V_{fb}$ is apparently close to the safe range, and it can be observed that the inrush current and the overshoot voltage are indeed improved dramatically therein.

Surely, a controlling method of a switching mode DC/DC converter according to the first preferred embodiment of the present invention can be rewritten as a second preferred embodiment of the present invention. It is a controlling method of a DC/DC converter (e.g., FIG. 1) includes steps of: causing a switching frequency of the converter to be operated at a rated value when a detected value ($V_{fb}$) of the output voltage of the converter (VO) is larger than a first predetermined value; and causing the switching frequency of the converter to be operated at the rated value multiplied by a second predetermined value when the detected value ($V_{fb}$) of the output voltage (VO) is not larger than the first predetermined value. The method further comprises a step of sending a feedback of the detected value ($V_{fb}$) to the converter to adjust the output voltage (VO) accordingly to curb at least one of an inrush current and an overshoot voltage generated by the converter during a soft-start thereof, wherein the DC/DC converter is a switching mode DC/DC converter.

Besides, a controlling method of a switching mode DC/DC converter according to the first preferred embodiment of the present invention can be rewritten as a third preferred embodiment of the present invention. It is a controlling method of a switching mode DC/DC converter includes a step of, when an output voltage of the converter (VO) is not larger than a first predetermined value, causing an operating frequency of the converter to be operated at a rated value multiplied by a second predetermined value (e.g., ¼~⅓). The first predetermined value is a detected value (e.g., $V_{fb}$) of the output voltage (VO) multiplied by a third predetermined value (e.g., 75%).

Embodiments

1. A controlling method for a switching mode DC/DC converter, comprising a step of, when a detected value of an output voltage of the converter is not larger than a first predetermined value, causing a switching frequency of the converter to be operated at a rated value multiplied by a second predetermined value to curb at least one of an inrush current and an overshoot voltage generated by the converter during a soft-start thereof.

2. A controlling method according to embodiment 1, wherein the converter comprises an input terminal, and the method further comprises steps of: causing the switching frequency of the converter to be operated at the rated value when the detected value of the output voltage is larger than the first predetermined value; and sending a feedback of the detected value to the input terminal to adjust the output voltage accordingly.

3. A controlling method according to embodiment 1 or 2, wherein the converter comprises two output terminals and a voltage divider electrically connected to the two output terminals in parallel, the voltage divider is used to detect the detected value, the first predetermined value is a rated output value of the voltage divider multiplied by a first rate, and the second predetermined value is a second rate.

4. A controlling method according to any one of embodiments 1 to 3, wherein the first rate is 0.75, the second rate is in a range of ¼ to ⅓, the voltage divider comprises a first and a second resistors electrically connected to each other in series, and the rated output value is a voltage drop of the second resistor.

5. A controlling method according to any one of embodiments 1 to 4, wherein the converter will generate the inrush current and the overshoot voltage during the soft-start in one of two states that a duty ratio and the switching frequency are a first and a second relatively low values respectively, and that the switching frequency is a relatively high value.

6. A controlling method according to any one of embodiments 1 to 5, wherein the converter receives an input voltage VIN and generates the output voltage VO, the duty ratio=VO/VIN, the first relatively low value is 0.1, the second relatively low value is 50 KHz, and the relatively high value is 1 MHz.

7. A controlling method for a DC/DC converter, comprising steps of:
    causing a switching frequency of the converter to be operated at a rated value when a detected value of an output voltage of the converter is larger than a first predetermined value; and
    causing the switching frequency of the converter to be operated at the rated value multiplied by a second predetermined value when the detected value of the output voltage is not larger than the first predetermined value.

8. A controlling method according to embodiment 7 further comprising a step of sending a feedback of the detected value to the converter to adjust the output voltage accordingly to curb at least one of an inrush current and an overshoot voltage generated by the converter during a soft-start thereof, wherein the DC/DC converter is a switching mode DC/DC converter.

9. A controlling method for a switching mode DC/DC converter, comprising a step of, when an output voltage of the converter is not larger than a first predetermined value, causing an operating frequency of the converter to be operated at a rated value multiplied by a second predetermined value.

10. A controlling method according to embodiment 9, wherein the first predetermined value is a detected value of the output voltage multiplied by a third predetermined value.

According to the aforementioned descriptions, the present invention provides a method of on-chip soft-start circuits for a switching mode DC/DC converter to curb an inrush current and an overshoot voltage generated by the converter during a soft-start thereof so as to possess the non-obviousness and the novelty.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A controlling method for a switching mode DC/DC converter, comprising a step of, when a detected value of an output voltage of the converter is not larger than a first predetermined value, causing a switching frequency of the converter to be operated at a rated value multiplied by a second predetermined value to curb at least one of an inrush current and an overshoot voltage generated by the converter during a soft-start thereof, wherein the first predetermined value is a rated output value of the detected value multiplied by a first rate, and both the first rate and the second predetermined value are no larger than 0.75.

2. The controlling method according to claim 1, wherein the converter comprises an input terminal, and the method further comprises steps of:
    causing the switching frequency of the converter to be operated at the rated value when the detected value of the output voltage is larger than the first predetermined value; and
    sending a feedback of the detected value to the input terminal to adjust the output voltage accordingly.

3. The controlling method according to claim 1, wherein the converter comprises two output terminals and a voltage divider electrically connected to the two output terminals in parallel, the voltage divider is used to detect the detected value, the rated output value is a rated output value of the voltage divider, and the second predetermined value is a second rate.

4. The controlling method according to claim 3, wherein the first rate is 0.75, the second rate is in a range of ¼ to ⅓, the voltage divider comprises first and second resistors electrically connected to each other in series, and the rated output value is a voltage drop of the second resistor.

5. The controlling method according to claim 1, wherein the converter will generate the inrush current and the overshoot voltage during the soft-start in a first state where a duty ratio and the switching frequency are first and second relatively low values respectively, and in a second state where the switching frequency is a relatively high value.

6. The controlling method according to claim 5, wherein the converter receives an input voltage VIN and generates the output voltage VO, the duty ratio=VO/VIN, the first relatively low value is 0.1, the second relatively low value is 50 KHz, and the relatively high value is 1 MHz.

7. A controlling method for a DC/DC converter, comprising steps of:
    causing a switching frequency of the converter to be operated at a rated value when a detected value of an output voltage of the converter is larger than a first predetermined value; and
    causing the switching frequency of the converter to be operated at the rated value multiplied by a second predetermined value when the detected value of the output voltage is not larger than the first predetermined value, wherein the first predetermined value is a rated output value of the detected value multiplied by a first rate, and both the first rate and the second predetermined value are no larger than 0.75.

8. The controlling method according to claim 7 further comprising a step of sending a feedback of the detected value to the converter to adjust the output voltage accordingly to curb at least one of an inrush current and an overshoot voltage generated by the converter during a soft-start thereof, wherein the DC/DC converter is a switching mode DC/DC converter.

9. A controlling method for a switching mode DC/DC converter, comprising a step of, when an output voltage of the converter is not larger than a first predetermined value, causing an operating frequency of the converter to be operated at a rated value multiplied by a second predetermined value, wherein the first predetermined value is a rated output value of the detected value multiplied by a first rate, and both the first rate and the second predetermined value are no larger than 0.75.

10. The controlling method according to claim 9, wherein the first predetermined value is a detected value of the output voltage multiplied by a third predetermined value.

* * * * *